United States Patent
Lei et al.

(10) Patent No.: US 10,868,722 B2
(45) Date of Patent: Dec. 15, 2020

(54) NETWORK DEVICE SYSTEM, METHOD FOR IMPLEMENTING NETWORK DEVICE SYSTEM AND COMPUTER-READABLE STORAGE MEDIUM

(71) Applicant: FUJITSU LIMITED, Kawasaki-shi, Kanagawa (JP)

(72) Inventors: Sheng Lei, Beijing (CN); Gang Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 199 days.

(21) Appl. No.: 16/047,845

(22) Filed: Jul. 27, 2018

(65) Prior Publication Data
US 2019/0052529 A1  Feb. 14, 2019

(30) Foreign Application Priority Data
Aug. 11, 2017  (CN) .......................... 2017 1 0685351

(51) Int. Cl.
*H04L 12/24* (2006.01)
*G06F 15/173* (2006.01)
(Continued)

(52) U.S. Cl.
CPC ........ *H04L 41/0816* (2013.01); *G06F 11/008* (2013.01); *G06F 15/173* (2013.01); *H04L 67/325* (2013.01)

(58) Field of Classification Search
None
See application file for complete search history.

(56) References Cited

U.S. PATENT DOCUMENTS

| 6,490,265 B1 * | 12/2002 | Sasaki | H04B 1/7085 |
| | | | 370/342 |
| 2009/0016263 A1 * | 1/2009 | Kishigami | H04B 7/04 |
| | | | 370/328 |

(Continued)

FOREIGN PATENT DOCUMENTS

| CN | 103906257 A | 7/2014 |
| CN | 106020933 A | 10/2016 |
| CN | 106155822 A | 11/2016 |

OTHER PUBLICATIONS

Lü, L. et al., "A Dynamic Resource Block Allocation of LTE System", vol. 31, No. 6, Journal of Nanjing University of Posts and Telecommunications (Natural Science). Dec. 2011. (with English Abstract).

(Continued)

*Primary Examiner* — Kodzovi Acolatse
(74) *Attorney, Agent, or Firm* — Arent Fox LLP (57) ABSTRACT

A network device system, a method for implementing a network device system and a computer-readable storage medium. The method includes: determining first times needed by functional modules of a network device in implementing respective functions according to processing abilities of physical resources; estimating second times needed by the functional modules in implementing respective functions according to the first times of the functional modules and empirical factors corresponding to the functional modules; determining physical resources needed by the network device according to the second times of the functional modules; and determining a scheduling scheme of the functional modules at current configurations according to the physical resources needed by the network device and scheduling schemes corresponding to different configurations of the functional modules. Hence, resources may be flexibly configured to meet different demands for traffics, (Continued)

801
first times needed by functional modules of a network device in implementing respective functions are determined according to processing abilities of physical resources 802
second times needed by the functional modules in implementing respective functions are estimated according to the first times of the functional modules and empirical factors corresponding to the functional modules 803
physical resources needed by the network device are determined according to the second times of the functional modules 804
a scheduling scheme of the functional modules at current configurations is determined according to the physical resources needed by the network device and scheduling schemes corresponding to different configurations of the functional modules thereby ensuing transmission quality while improving energy efficiency.

15 Claims, 3 Drawing Sheets

(51) Int. Cl.
*G06F 11/00* (2006.01)
*H04L 29/08* (2006.01)

(56) References Cited

U.S. PATENT DOCUMENTS

2009/0235055 A1* 9/2009 Araki .................... G06F 9/4887
712/208
2012/0287881 A1 11/2012 Arnott et al.
2013/0034067 A1* 2/2013 Umesh ................ H04W 74/002
370/329
2019/0174526 A1* 6/2019 Liu ....................... H04L 1/0007
2019/0363765 A1* 11/2019 Yoshioka ............. H04B 7/0617

OTHER PUBLICATIONS

Luo J. et al., "Research and Implementation on Mapping of DVRB and DPRB in LTE System", vol. 38, No. 5. 2014. (with English Abstract).

* cited by examiner

NETWORK DEVICE SYSTEM, METHOD FOR IMPLEMENTING NETWORK DEVICE SYSTEM AND COMPUTER-READABLE STORAGE MEDIUM

CROSS-REFERENCE TO RELATED APPLICATIONS

This application claims priority to Chinese Patent Application No. 201710685351.4, filed on Aug. 11, 2017. The disclosure of the priority application is incorporated in its entirety herein by reference.

FIELD

This disclosure relates to the field of communications, and in particular to a network device system, a method for implementing a network device system and a computer readable storage medium.

BACKGROUND

As exponential increase of wireless data, how to improve energy efficiencies of communication deployment becomes one of problems needing to be solved. Functions of network units that are usually implemented by hardware having dedicated functions being virtually implemented by software, that is, network function virtualization (NFV), is advantageous in more flexible and fully utilizing existing resources, such as a processor.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that different from an application-specific integrated circuit (ASIC), a general purpose processor, such as an Intel-architecture server (IA-server), is hard to ensure real time of communication processing if specific functions are processed by each module or resource as that in the ASIC as the specificity and exclusivity of specific functions are not taken into account.

In order to solve such a problem, embodiments of this disclosure provide a network device system, a method for implementing a network device system and a computer readable storage medium.

According to a first aspect of the embodiments of this disclosure, there is provided a network device system, including:

a calculating unit configured to, according to processing abilities of physical resources, determine first times needed by functional modules of a network device in implementing respective functions;

an estimating unit configured to, according to the first times of the functional modules and empirical factors corresponding to the functional modules, estimate second times needed by the functional modules in implementing respective functions;

a self-organization processing unit configured to determine physical resources needed by the network device according to the second times of the functional modules; and a scheduling unit configured to determine a scheduling scheme of the functional modules at current configurations according to the physical resources needed by the network device and scheduling schemes corresponding to different configurations of the functional modules.

According to a second aspect of the embodiments of this disclosure, there is provided a method for implementing a network device system, including:

determining first times needed by functional modules of a network device in implementing respective functions according to processing abilities of physical resources;

estimating second times needed by the functional modules in implementing respective functions according to the first times of the functional modules and empirical factors corresponding to the functional modules;

determining physical resources needed by the network device according to the second times of the functional modules; and determining a scheduling scheme of the functional modules at current configurations according to the physical resources needed by the network device and scheduling schemes corresponding to different configurations of the functional modules.

According to a third aspect of the embodiments of this disclosure, there is provided a computer readable program, which, when executed in a processor of a computer, will cause the processor of the computer to carry out steps of the method described in the second aspect.

According to a fourth aspect of the embodiments of this disclosure, there is provided a computer readable storage medium, including a computer readable program, which will cause a processor to carry out steps of the method described in the second aspect.

An advantage of the embodiments of this disclosure exists in that functions of the network device are implemented by software, fully taking specialty of communication signal processing and characteristics of general purpose resource processing into account, and times for processing are reduced by highly optimization calculation. And furthermore, as the NFV is full softwareized, more efficient and compact parallel processing with fewest resources (such as physical resource cores) is achieved by configuration and setting, satisfying requirements for real-time signal processing, and as changes of processing amounts, different requirements may be flexibly satisfied by changing the configurations.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access, and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal device to the communication network and provides services for the terminal device. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC), etc.

In the embodiments of this disclosure, the base station includes but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

In the embodiments of this disclosure, the user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Various embodiments of this disclosure shall be described with reference to the accompanying drawings. These embodiments are illustrative only, and are not intended to limit this disclosure.

Embodiment 1

Figure 1:
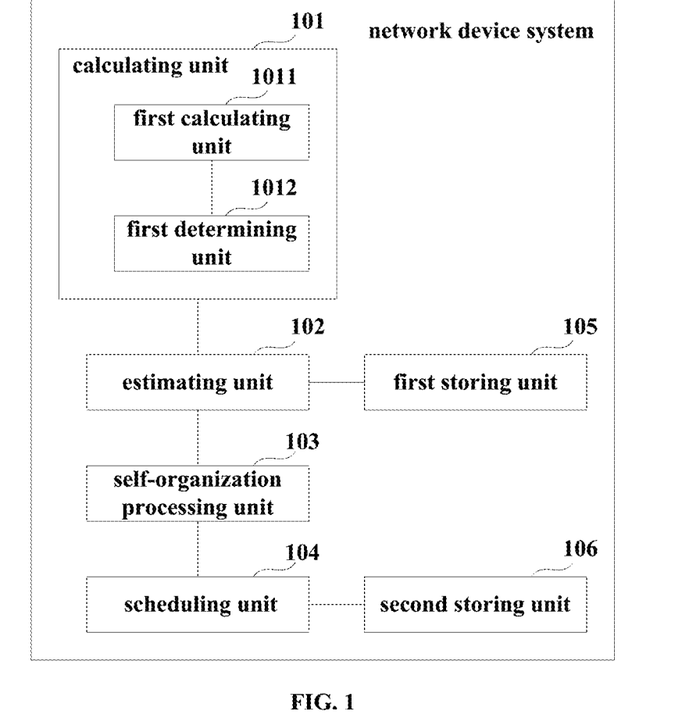
FIG. 1 is a schematic diagram of the network device system of Embodiment 1.

The embodiment of the present disclosure provides a network device system. FIG. 1 is a schematic diagram of the network device system. As shown in FIG. 1, the network device system includes: a calculating unit 101, an estimating unit 102, a self-organization processing unit 103 and a scheduling unit 104.

In this embodiment, the calculating unit 101 determines first times needed by functional modules of a network device in implementing respective functions according to processing abilities of physical resources; the estimating unit 102 estimates second times needed by the functional modules in implementing respective functions according to the first times of the functional modules and empirical factors corresponding to the functional modules; the self-organization processing unit 103 determines physical resources needed by the network device according to the second times of the functional modules; and the scheduling unit 104 determines a scheduling scheme of the functional modules at current configurations according to the physical resources needed by the network device and scheduling schemes corresponding to different configurations of the functional modules.

In this embodiment, meanings of the network device are as described above, and shall not be described herein any further. In one implementation, the network device is a base station as described above, and the network device system of this embodiment may be used for implementing functions of a physical layer of the base station, and functional modules of the above-described network device may be functional modules of the physical layer of the base station, which may include a demodulation module (DEMOD), a decoding module (DECODE), a cyclic redundancy check module (CRC check), and a downlink module (DL), and furthermore, it may include a physical random access channel module (PRACH).

Figure 2:
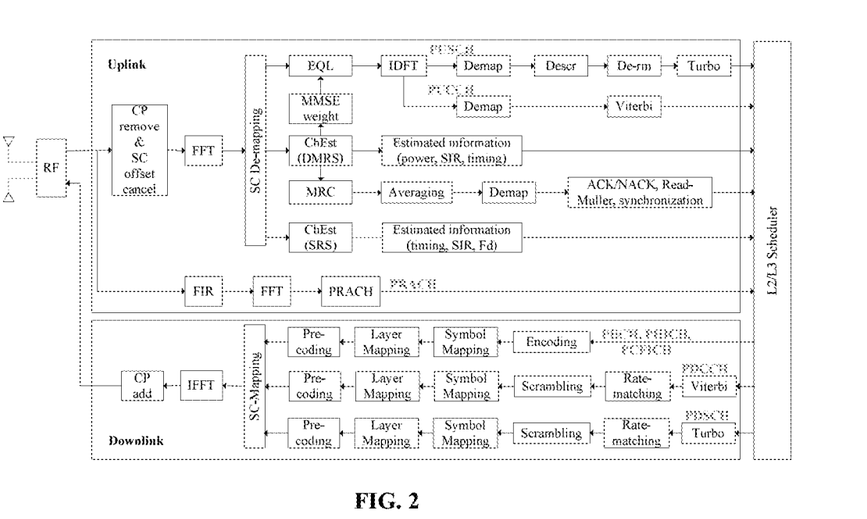
FIG. 2 is a schematic diagram of physical modules of a base station of an LTE system.

FIG. 2 is a schematic diagram of functional modules of the physical layer of a base station of an LTE system. As shown in FIG. 2, the base station in the LTE system includes multiple functional modules of a downlink and multiple functional modules of an uplink. In this embodiment, calculating a first time of each functional module needs a large number of resources and times. In order to solve such a problem, first times of a part of the functional modules may be calculated only, and first times of other functional modules are deduced accordingly.

As shown in FIG. 1, the calculating unit 101 includes a first calculating unit 1011 and a first determining unit 1012. The first calculating unit 1011 calculates the first time of a first functional module, and the first determining unit 1012 determines the first time of a second functional module according to the first time of the first functional module, wherein, a difference between a calculation amount of the first functional module and that of the second functional module is in a predetermined range.

In this embodiment, as shown in FIG. 2, many physical channels have similar or even identical functional modules. Calculation of the first times is only performed on a part of the functional modules (such as a precoding module, and a PRACH module, etc., shown in FIG. 2) in this embodiment. And the first times of other similar functional modules may be obtained according to the first times of the functional modules of which the first times have been calculated (the first determining unit 1012).

In this embodiment, similar functional modules refer to functional modules having equivalent calculation amounts or processing amounts. As the calculation amounts or processing amounts are equivalent, equivalent physical resources are needed by such similar functional modules, and by only calculating a first time of one functional module, first times of other functional modules may be obtained. For example, as matrix-vector multiplication is similar to an encoding module, a first time of the encoding module may only be calculated, thereby obtaining a first time of the matrix-vector multiplication. For another example, as an operation of fast Fourier transform (FFT)/inverse fast Fourier transform (IFFT) is similar to that of discrete Fourier transform (DFT)/inverse discrete Fourier transform (IDFT) in the PRACH module, a first time of the FFT/IFFT may only be calculated, thereby obtaining a first time of the operation of the DFT/IDFT in the PRACH module. The above similar functional modules are illustrative only, and for other functional modules of the base station in the LTE system, their first times may also be calculated or determined by using the similar method.

In this embodiment, the first time may be referred to as a theoretical processing time or theoretical performance estimation, in which operations of addition, subtraction, multiplication, and division, etc., are added up indiscriminately to obtain a total operation amount. Assuming that four operations may be performed in parallel in each time of operation, which are divided by a processing ability of a physical resource, such as a core frequency of a CPU, the first time may be obtained:

$$T_{estimated} = (\text{TotalOperation}/4)/\text{CoreFrequency}.$$

Taking a precoding module having the number of layers $\upsilon$ and a transmitting antenna P as an example, for each subcarrier, a simple matrix-vector multiplication is included, and it is as follows:

$$y(i) = W \cdot x(i).$$

And it is expressed as:

$$\begin{bmatrix} y_0^{re}(i) + j \cdot y_0^{im}(i) \\ M \\ y_{P-1}^{re}(i) + j \cdot y_{P-1}^{im}(i) \end{bmatrix} =$$

$$\begin{bmatrix} w_{0,0}^{re} + w_{0,0}^{im} & \Lambda & w_{0,v-1}^{re} + w_{0,v-1}^{im} \\ M & O & M \\ w_{P-1,0}^{re} + w_{P-1,0}^{im} & \Lambda & w_{P-1,v-1}^{re} + w_{P-1,v-1}^{im} \end{bmatrix} \cdot \begin{bmatrix} x_0^{re}(i) + j \cdot x_0^{im}(i) \\ M \\ x_{v-1}^{re}(i) + j \cdot x_{v-1}^{im}(i) \end{bmatrix};$$

where, for an i-th subcarrier, $0 \le i < N_{subcarrier}$, x(i) being $\upsilon \times 1$ complex vectors used for precoding, y(i) being P×1 precoded complex vectors, and w being a common P×$\upsilon$ precoding matrix. Hence, it may be obtained that, $$y_k^{re}(i) + j \cdot y_k^{im}(i) = \Sigma_{l=0}^{\upsilon-1}(w_{k,l}^{re} + w_{k,l}^{im}) \cdot x_l^{re}(i) + j \cdot x_l^{im}(i)).$$

It can be seen that for calculation of each complex unit $y_k^{re}(i) + j \cdot y_k^{im}(i)$, $0 \le k < P$ and $0 \le i < N_{subcarrier}$, and there are totally u complex multiplications and $\upsilon - 1$ complex additions. Hence, $P \cdot \upsilon \cdot N_{subcarrier}$ times of complex multiplications and $P \cdot (\upsilon-1) \cdot N_{subcarrier}$ times of complex additions are totally contained; where, $N_{subcarrier}$ is the number of subcarriers. Each complex multiplication is four real number multiplications and two real number additions/subtractions, and each complex addition is two real number additions/subtractions. A total number of corresponding real number operations is:

$$\text{TotalOperaion} = 4 \cdot P \cdot \upsilon \cdot N_{subcarrier}(x)(2 \cdot P \cdot \upsilon N_{subcarrier} + 2 \cdot P \cdot (\upsilon-1) \cdot N_{subcarrier})(+) = P \cdot (8 \cdot \upsilon - 2) \cdot N_{subcarrier}$$

For different configurations (estimation parameters), estimated theoretical performances are different. For example, for 2×2 multiple input multiple output (MIMO), $P = \upsilon = 2$, $N_{subcarrier} = 1200$, and assuming that a frequency of a CPU is 2.1G Hz, its estimated theoretical performance is:

$$T_{estimated} = \frac{TotalOperation/4}{CoreFrequency} =$$

$$\frac{P \cdot (8 \cdot v - 2) \cdot N_{subcarrier}/4}{CoreFrequency} = \frac{2 \cdot (8 \cdot 2 - 2) \cdot 1200/4}{2.1 \times 10^9} = 4 \text{ us.}$$

For another example, for 4×4 MIMO, P=υ=4, $N_{subcarrier}$=1200, and assuming that a frequency of a CPU is 2.1G Hz, its estimated theoretical performance is:

$$T_{estimated} = \frac{TotalOperation/4}{CoreFrequency} =$$

$$\frac{P \cdot (8 \cdot v - 2) \cdot N_{subcarrier}/4}{CoreFrequency} = \frac{2 \cdot (8 \cdot 4 - 2) \cdot 1200/4}{2.1 \times 10^9} = 17.1 \text{ us.}$$

Figure 3:
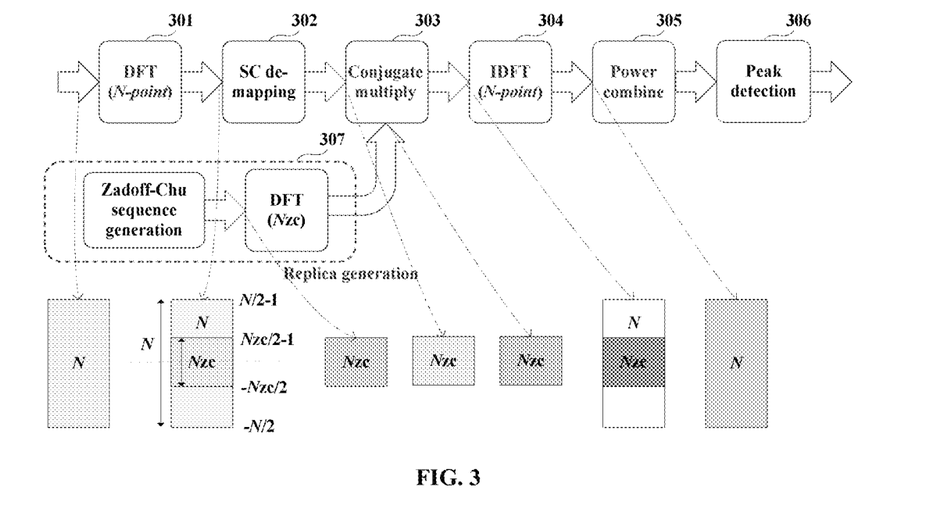
FIG. 3 is a schematic diagram of an estimation principle of a first time of a PRACH module.

Further taking the PRACH module as an example, as shown in FIG. 3, there are seven parts, 301-307, in which the numbers of operations enclosed by square brackets (i.e. [ ]) denote numbers of operations of detailed real number multiplications or additions/subtractions of five parts, correspondingly respectively to five parts, "replica generation" 307, "N point DFT" 301, "conjugate multiply" 303, "N point IDFT" 304, and "power combine" 305; and at the same time, there is only a comparison operation in a module part of "peak detection" 306. Here, an operation in "subcarrier (SC) de-mapping" 302 is ignored. Hence, a total operation (TotalOptPRACH) may be expressed as:

$$\begin{aligned}
\text{Total Opt } PRACH = &\ ([4 \cdot (N_{root} \cdot N_{ZC})] + [4 \cdot (N/6 \cdot \log_2(N/3) \cdot 3 + \\
& N \cdot 2) \cdot N_R \cdot \text{Repeat}] + [4 \cdot (N_R \cdot \text{Repeat} \cdot \\
& N_{root} \cdot N_{ZC})] + [(4 \cdot (N/6 \cdot \log_2(N/3) \cdot 3 + N \cdot \\
& 2) + N \cdot 2) \cdot N_R \cdot \text{Repeat} \cdot N_{root}] + \\
& [2 \cdot (N_R \cdot \text{Repeat} \cdot N_{root} \cdot N) + N_{root} \cdot N]) \ (x) + \\
& ([2 \cdot (N_{root} \cdot N_{ZC})] + [(2 \cdot (N/6 \cdot \\
& \log_2(N/3) \cdot 3 + N \cdot 2) + 2 \cdot (N/3 \cdot \log_2(N/3) \cdot \\
& 3 + N \cdot 2)) \cdot N_R \cdot \text{Repeat}] + [2 \cdot (N_R \cdot \text{Repeat} \cdot \\
& N_{root} \cdot N_{ZC})] + [((2 \cdot (N/6 \cdot \log_2(N/3) \cdot 3 + \\
& N \cdot 2) + 2 \cdot (N/3 \cdot \log_2(N/3) \cdot 3 + N \cdot 2)) \cdot \\
& N_R \cdot \text{Repeat} \cdot N_{root}] + [1 \cdot (N_R \cdot \text{Repeat} \cdot \\
& N_{root} \cdot N) + (N_R \cdot \text{Repeat}) \cdot N_{root} \cdot N]) \ (+) + \\
& ([N_{root} \cdot N \cdot N_{peak}]) \ (\text{Comparison in} \\
& \text{"Peak detection"}) \\
= &\ 6 \cdot N_{root} \cdot N_{ZC} + (5 \cdot \log_2(N/3) + 16) \cdot N_R \cdot \\
& \text{Repeat} \cdot (N_{root} + 1) \cdot N + 6 \cdot N_R \cdot \text{Repeat} \cdot \\
& N_{root} \cdot (N_{ZC} + N) + N_{root} \cdot N \cdot (N_{peak} + 1)
\end{aligned}$$

In this formula, it is considered that the number of receiver antennas as $N_R$=4, a preamble format as Preamble-Format=3 with the number of times of repeating of PRACH sequences Repeat=2, and $N_{ZC}$=839, a zero correlation zone (cyclic shift) length as $N_{CS}$=0 with $N_{root}$=64 different root Zadoff-Chu sequences (i.e., different physical root sequence number u(i), 0≤i<$N_{root}$) for the needed 64 preambles, and the DFT/IDFT size as N=1536. The estimated theoretical performance is given as:

$$T_{estimated} = \frac{TotalOperation/4}{CoreFrequency}$$

$$= \frac{(6 \cdot 64 \cdot 839 + (5 \cdot \log_2 512 + 16) \cdot 4 \cdot 2 \cdot 65 \cdot 1536 + 6 \cdot 4 \cdot 2 \cdot 64 \cdot (839 + 1536) + 64 \cdot 1536 \cdot 4)/4}{2.1 \times 10^9}$$

$$\approx 6754 \text{ us}$$

The method for calculating the first times are described above by taking the precoding module and the PRACH module as examples. And first times of other functional modules may be calculated by using similar methods, or may be estimated based on the first times of the functional module of which the first times have been calculated, which are as described above, and shall not be described herein any further.

In this embodiment, as shown in FIG. 1, the network device system 100 may further include a first storing unit 105 configured to store the empirical factors corresponding to the functional modules, also referred to as optimization factors or weighting coefficients. And according to the first times of the functional modules and the empirical factors corresponding to the functional modules, the estimating unit 102 estimates the second times needed by the functional modules in implementing respective functions, which may also be referred to as true times, or optimized times, or optimized performances. In this embodiment, a range of values of the empirical factors is 0~1, that is, the values of the empirical factors may be taken from a range of 0~1.

In this embodiment, the estimating unit 102 may multiply the first times of the functional modules by the empirical factors corresponding to the functional modules, and takes results of the multiplication as the second times needed by the functional modules in implementing respective functions.

In this embodiment, the above empirical factors are obtained according to experiences, and due to optimization of CPU cache after the optimization and out of order execution, the optimized times are shorter than the theoretically estimated times, that is, the above first times may be further optimized. Taking the precoding module as an example, for a case of 2×2 MIMO, a calculated first time is 4 us, and it is assumed that a first time expected to be obtained is 3 us, that is, an optimized time is 3 us, an empirical factor may be set to be 3/4=75%; likewise, for a case of 4×4 MIMO, a calculated first time is 17.1 us, and it is assumed that a first time expected to be obtained is 13 us, that is, an optimized time is 13 us, an empirical factor may be set to be 13/17.1≈76%. Taking the PRACH module as an example, a calculated first time is 6754 us, and it is assumed that a first time expected to be obtained is 4174 us, that is, an optimized time is 4174 us, an empirical factor may be set to be 4174/6754≈62%.

Table 1 shows examples of theoretical performances, baseline performances, best optimized performances, best optimized performance percentages referring to the estimated theoretical performance (briefly referred to as optimization referring to theoretical), and speedup of baseline, of a precoding module, an MIMO minimum mean square error (MMSE) module, a descrambling module and a PRACH module.

| Modules | Theoretical performances | Baseline performances | Best optimized performances | Optimization referring to theoretical | Speedup of baseline |
|---|---|---|---|---|---|
| Precoding(2 × 2) | 4 us | 95 us | 3 us | 3/4 = 75% | 95/3 ≈ 32 |
| MIMO MMSE | 18.6 us | 463 us | 15.6 us | 15.6/18.6 ≈ 84% | 463/15.6 ≈ 30 |
| Descrambling | 50 us | 865 us | 31 us | 31/50 = 62% | 865/31 ≈ 28 |
| PRACH | 6754 us | 163553 us | 4174 us | 4174/6754 ≈ 62% | 163553/4174 ≈ 39 |

As shown in Table 1, "the theoretical performances" are the above-described first times, "the baseline performances" are time that are not optimized, and "the best optimized performances" are times that are highly optimized. By comparing the best optimized performances with the theoretical performances, empirical values, i.e. the optimization referring to the theoretical, may be obtained.

As shown in Table 1, in comparison with unoptimized results (the baseline performances), optimization by about 30 multiples (as shown in Table 1, it is 28-29 multiples for the selected modules) may be achieved by the method of this embodiment, and whatever the optimization is sufficient, it may be used to direct optimization of other modules. By comparing the optimization results percentages of the theoretical estimated performances, the optimized performances will be 62%~84% for the selected modules. Such estimation experiences may be used for drafting estimation and predicting processing times of other modules, that is, they may be used as empirical coefficients, and further used for estimating and predicting calculation amounts of all modules and a corresponding needed total time.

For example, for theoretical estimation that can be obtained and possible optimal optimized performances, a constant look-up table (LUT) may be generated, which is stored in the first storing unit 105. And such estimation and evaluation may also assist in attempting to investigate and finding more efficient algorithms for implementation, and all possible methods that can be found may be directly used for further optimization.

In this embodiment, after the theoretical processing times (the first times) of the functional modules are calculated by the calculating unit 101, the estimating unit 102 obtains estimated detailed true times (the second times) according to already-known estimation results of best optimized implementation under direction of theoretical estimation experiences, and such estimated time results may be used for designing and determining a self-organization processing structure of the self-organization processing unit 103 and the scheduling schemes of the scheduling unit 104 used for processing core resource allocation and multi-core processing.

In this embodiment, the physical resources are processing cores, and the self-organization processing unit 103 may determine the number of processing cores needed by the network device according to the processing ability of each processing core and the second times of the functional modules.

In this embodiment, as times at different configurations may be prepared and got in advance of the true running, the functional modules may be divided into multiple separated parts, which is similar to hardware design, in which each functional module or each part executes a specific function. A difference between software functional modules or parts exists in that software is based on processing times, different functional sub-modules may be deemed as one software part, and latency between sub-functions or sub-parts is very small or may be ignored, which is similar to a concept of hardware design. According to such times, fewest physical resources may be determined, such as a CPU core, referred to as a processing core.

In this embodiment, as shown in FIG. 1, the network device system 100 may further include a second storing unit 106 configured to store the scheduling schemes corresponding to the different configurations of the functional modules. Hence, the scheduling unit 104 may determine a scheduling method of the functional modules at current configurations according to the physical resources (the number of the processing cores) needed by the network device and the scheduling schemes corresponding to different configurations of the functional modules. The configurations here may be, for example, a bandwidth, the number of antennas, and a transmission mode, etc. Scheduling schemes are different for different configurations, which may be expressed by tables, which may be referred to as scheduling scheme lookup tables, briefly referred to as lookup tables. And the scheduling unit 104 may select corresponding a scheduling scheme from the lookup tables according to the current configuration of the network device.

For example, a downlink may be deemed as one part, referred to as a DL module, an uplink may be deemed as three parts, which are a demodulating module, a decoding module and a CRC module, and the scheduling unit 104 may select a particular scheduling scheme from the lookup table based on multiplication of estimation results (first times) of the functional modules by their respective empirical factors and according to the number of processing cores needed by the network device. And the processing of the scheduling unit 104 may be expressed as:

Selected_Scheme=LUT(DEMOD*$\beta_{DEMOD}$, DECOND*$\beta_{DECOD}$,CRCcheck*$\beta_{CRCcheck}$, DL*$\beta_{DL}$);

where, LUT is the above lookup table, DEMOD is the estimation result (first time) of the demodulating module, $\beta_{DEMOD}$ is the empirical factor to which the demodulating module corresponds, DECOD is the estimation result (first time) of the decoding module, $\beta_{DECOD}$ is the empirical factor to which the decoding module corresponds, CRC check is the estimation result (first time) of the CRC module, $\beta_{CRCcheck}$ is the empirical factor to which the CRC module corresponds, DL is the estimation result (first time) of the DL module, and $\beta_{CL}$ is the empirical factor to which the DL module corresponds; wherein, a range of values of $\beta_{DEMOD}$, $\beta_{DECOD}$, $\beta_{CRCcheck}$ and $\beta_{CL}$ is 0~1, so as to ensure real time of the processing.

Figure 4:
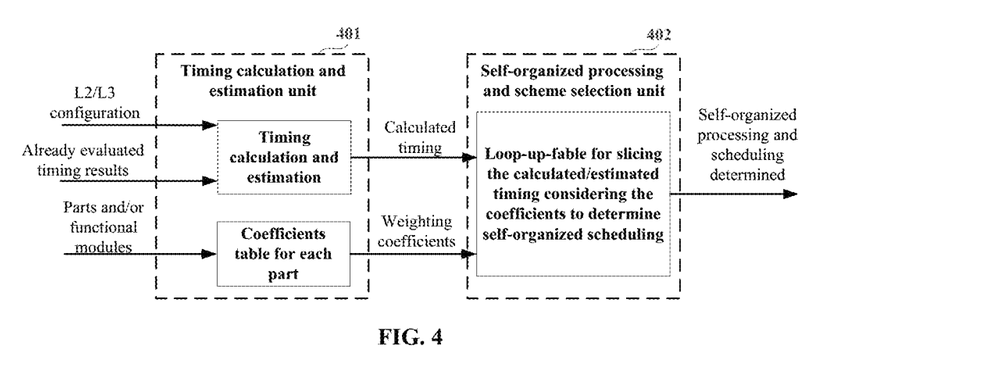
FIG. 4 is a schematic diagram of control cores of a time calculating and estimating unit, a self-organization processing and scheme selecting unit.

FIG. 4 shows control cores of the calculating unit 101, the estimating unit 102, the self-organization processing unit 103 and the scheduling unit 104. In FIG. 4, functions of the calculating unit 101 and the estimating unit 102 are combined into a timing calculation and estimation unit 401, and functions of the self-organization processing unit 103 and the scheduling unit 104 are combined into a self-organization processing and scheme selection unit 402. As shown in FIG. 4, the timing calculation and estimation unit 401 may provide the calculated first times and empirical factors corresponding to the parts and/or the functional modules to the self-organization processing and scheme selection unit 402, that is, directly providing the calculated second times to the self-organization processing and scheme selection unit 402, and the self-organization processing and scheme selection unit 402 may determine the number of the processing cores needed by the network device by multiplying the above first times by the above empirical factors or directly according to the second times, and select an appropriate scheduling scheme from the above lookup table accordingly.

In one implementation, the network device needs only one processing core, and the scheduling scheme may be that: the processing core process not only uplink transmission of the network device, but also downlink transmission of the network device, and within one subframe, the processing core first schedules the uplink transmission of the network device and then schedules the downlink transmission of the network device.

In another implementation, the network device needs two or more processing cores, and the scheduling scheme may be that: each processing core processes not only uplink transmission of the network device, but also downlink transmission of the network device, and if scheduling of all functions of one functional module is unable to be implemented within one subframe, all the functions of the functional module are apportioned into multiple processing cores for scheduling.

Figure 5:
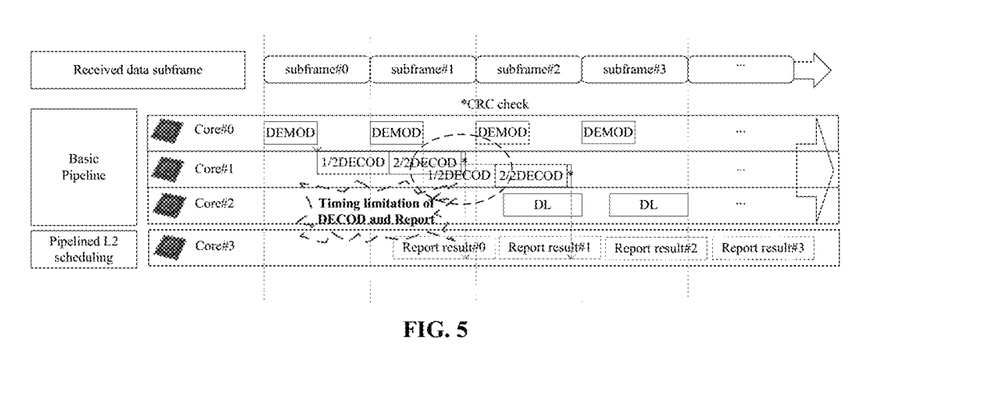
FIG. 5 is a schematic diagram of a scheduling method using three processing cores in the related art.

FIG. 5 shows a usually typical scheduling scheme, in which the self-organizing processing and scheduling process of this embodiment is not adopted. In this scheme, each processing core performs processing of one specific function, and if a functional module, such as the decoding module, is very time-consuming, processing of a current subframe (subframe #1) needs to be started when processing of a previous subframe (such as subframe #0) is not finished, thereby producing temporal collision, and resulting in decoding errors in the current and subsequent subframes. And at the same time, as the decoding is not finished in time, its result is unable to be punctually reported to an L2 layer for performing scheduling of the L2 layer, that is, a requirement of communication for real time is unable to be met, there exists temporal collision, and data are unable to be correctly decoded and reported.

Figure 6:
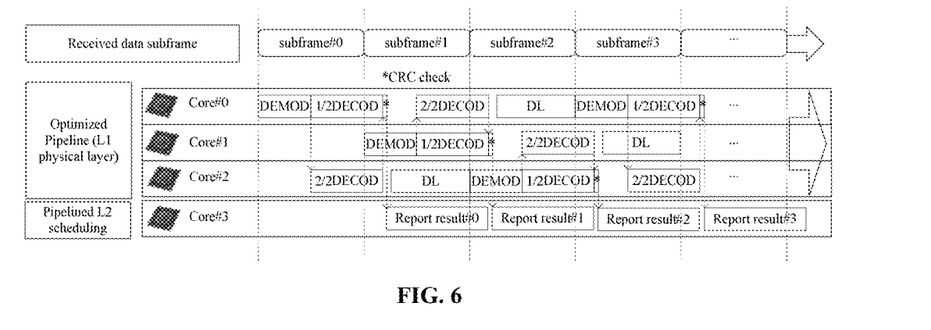
FIG. 6 is a schematic diagram of a scheduling method using three processing cores in this embodiment.

FIG. 6 shows a case where three processing cores (#0/#1/#2) are used for processing of a physical uplink shared channel (PUSCH), or a physical uplink control channel (PUCCH), or an uplink monitoring channel (SRS), of data service. In this example, decoding (DECOD) of the PUSCH may be divided into two parts, punctual completion of the decoding may be achieved with mutual assistance between the cores, and results are reported to the L2 layer for performing scheduling of the L2 layer. The processing core #3 is an independent core and used for the PRACH, and as an amount of calculation of a control core is not large and scheduling of the PRACH is not frequent, the PRACH processing core and the control core may be the same physical core.

Hence, if a 20 MHz bandwidth, two transmission antennas, two reception antennas, and the transmission mode 3 or transmission mode 4, are configured, adoption of three processing cores (used for the PUSCH/PUCCH/SRS) and one control core is able to ensure signal processing in a real-time manner. In this example, the control core may be identical to the PRACH processing core, and a thread of the control core may have a higher priority.

In this embodiment, if the configuration is lower, such as one transmission antenna and one reception antenna, a 1.4 MHz or 3 MHz or 5 MHz bandwidth, or a simple application, such as a 5G narrowband IoT (NB-IoT), a time needed for processing is very short, and only one core is needed to sufficiently process an uplink (UL), a downlink (DL), a control core and an access core (such as the PRACH). Here, the access core (such as the PRACH) may be identified via a subframe type message.

Figure 7:
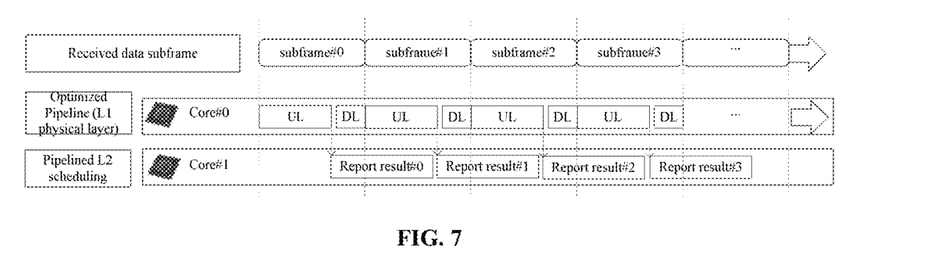
FIG. 7 is a schematic diagram of a scheduling method using one processing core in this embodiment.

FIG. 7 shows a case where one process core (#0) is used for all the above processing. As shown in FIG. 7, for a case of one transmission antenna and one reception antenna and 10 MHz or 20 MHz bandwidth, one physical core and one control core are adopted, that is, all the above processing is finished by two cores.

The cases where three processing cores and one processing core are needed to carry out the functional modules of the network device are shown above in FIGS. 6 and 7; however, this embodiment is not limited thereto. And in other scenarios and/or under other demands and/or other configurations, the number of processing cores finally determined according to the processing of the calculating unit 101, the estimating unit 102 and the self-organization processing unit 103 may be another case, and correspondingly, the scheduling unit 104 selects a scheduling scheme from the above lookup table according to the number of processing cores needed by the network device.

For example, for a network device of a configuration of medium-level complexity, when the needed processing times estimated by the calculating unit 101 and the estimating unit 102 are also of medium levels, such as 5 MHz or 10 MHz bandwidth, two transmission antennas and two reception antennas, and two processing cores are determined by the self-organization processing unit 103, the scheduling unit 104 performs processing by using two processing cores and one control core (three cores in total), so as to meet the requirement for real time.

For another example, for a network device of a configuration of high complexity, when the needed processing times estimated by the calculating unit 101 and the estimating unit 102 are also high, such as 20 MHz bandwidth, four transmission antennas and four reception antennas, and five or more processing cores are determined by the self-organization processing unit 103, the scheduling unit 104 performs processing by using corresponding numbers of processing cores and control cores, so as to meet the requirement for real time.

In the network device system of this embodiment, the functions of the network device are implemented by software, fully taking specialty of communication signal processing and characteristics of general purpose resource processing into account, and times for processing are reduced by highly optimization calculation. And furthermore, as the NFV is full softwarerized, more efficient and compact parallel processing with fewest resources (such as physical resource cores) is achieved by configuration and setting, satisfying requirements for real-time signal processing, and as changes of processing amounts, different requirements may be flexibly satisfied by changing the configurations. Hence, resources may be flexibly configured to satisfy demands for different traffics, thereby ensuing transmission quality while improving energy efficiency.

Embodiment 2

The embodiment of the present disclosure provides a method for implementing a network device system. As principles of the method are identical to that of the method of Embodiment 1, identical contents shall not be described herein any further.

Figure 8:
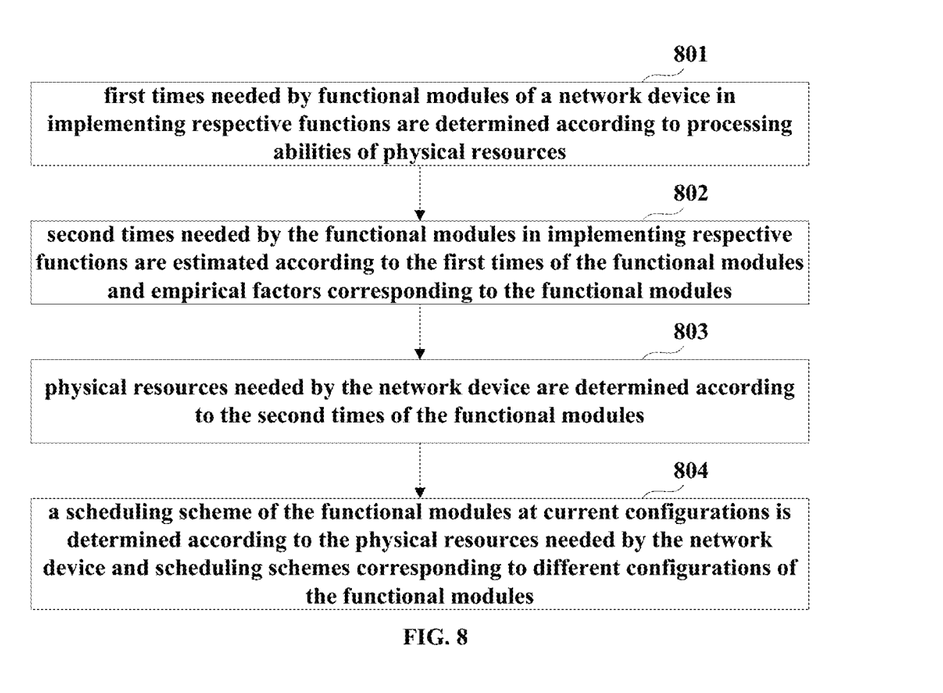
FIG. 8 is a flowchart of the method for implementing a network device system of Embodiment 2.

FIG. 8 is a flowchart of the method. As shown in FIG. 8, the method includes:

step 801: first times needed by functional modules of a network device in implementing respective functions are determined according to processing abilities of physical resources;

step 802: second times needed by the functional modules in implementing respective functions are estimated according to the first times of the functional modules and empirical factors corresponding to the functional modules;

step 803: physical resources needed by the network device are determined according to the second times of the functional modules; and step 804: a scheduling scheme of the functional modules at current configurations is determined according to the physical resources needed by the network device and scheduling schemes corresponding to different configurations of the functional modules.

In this embodiment, the network device may be a base station, and functional modules of the network device may be functional modules of the base station, such as functional module of a physical layer of the base station, which may include but not limited to a demodulation module (DEMOD), a decoding module (DECODE), a cyclic redundancy check module (CRC check), and a downlink module (DL). In one implementation, the functional module of the physical layer of the base station may further include or only include a physical random access channel module (PRACH).

In this embodiment, "the first time" may also be referred to as a theoretical processing time or theoretical performance and corresponds to the second column in Table 1, and "the second time" may also be referred to as a practical processing time or a true time or an optimal optimization performance and corresponds to the fourth column in Table 1.

In step 801, the first time of a first functional module may be calculated first according to the processing abilities of the physical resources, and then the first time of a second functional module may be calculated according to the first time of the first functional module, wherein, a difference between a calculation amount of the first functional module and that of the second functional module is in a predetermined range. Hence, by using a characteristic that calculation amounts of some functional modules are similar, first times of the functional modules of the network device need not to be calculated one by one, thereby saving resources for calculation.

In step 802, the first times of the functional modules may be multiplied by the empirical factors corresponding to the functional modules, and results of the multiplication may be taken as the second times needed by the functional modules in implementing respective functions. Hence, due to optimization of CPU cache after the optimization and out of order execution, the estimated theoretical times may be further optimized. In step 802, the empirical factors are obtained according to experiences and correspond to different functional modules, which may be expressed in a form of a table, such that the estimated theoretical times are further optimized accordingly.

In this embodiment, the physical resources may be processing cores, and in step 803, the number of processing cores needed by the network device, that is, the number of processing cores needed in executing all functions of the above functional modules of the network device, may be determined according to a processing ability of each processing core and the second times of the functional modules.

In step 804, the scheduling schemes corresponding to different configurations of the functional modules are predefined, and may be expressed by a table. Hence, after determining current configuration of the functional modules, corresponding scheduling scheme may be selected from the table based on the configuration.

In one implementation of step 804, the scheduling scheme is that: when the physical resource needed by the network device is one processing core, the processing core processes not only uplink transmission of the network device, but also downlink transmission of the network device, and within one subframe, the uplink transmission of the network device is scheduled first, and then the downlink transmission of the network device is scheduled, which are as shown in FIG. 7, and shall not be described herein any further.

In another implementation of step 804, the scheduling scheme is that: when the physical resources needed by the network device are more than two processing cores, each processing core processes not only uplink transmission of the network device, but also downlink transmission of the network device, and if scheduling of all functions of one functional module is unable to be implemented within one subframe, all the functions of the functional module are apportioned into multiple processing cores for scheduling, which are as shown in FIG. 6, and shall not be described herein any further.

In the method of this embodiment, the functions of the network device are implemented by software, fully taking specialty of communication signal processing and characteristics of general purpose resource processing into account, and times for processing are reduced by highly optimization calculation. And furthermore, as the NFV is full softwarerized, more efficient and compact parallel processing with fewest resources (such as physical resource cores) is achieved by configuration and setting, satisfying requirements for real-time signal processing, and as changes of processing amounts, different requirements may be flexibly satisfied by changing the configurations. Hence, resources may be flexibly configured to satisfy demands for different traffics, thereby ensuing transmission quality while improving energy efficiency.

An embodiment of this disclosure further provides a computer readable program, which, when executed in a processor of a computer, will cause the processor to carry out steps of the method described in Embodiment 2.

An embodiment of this disclosure further provides a computer readable storage medium, including a computer readable program, which will cause a processor to carry out steps of the method described in Embodiment 2.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method/apparatus with reference to the embodiments of this disclosure may be directly embodied as hardware, software modules executed by a processor, or a combination thereof. For example, one or more functional block diagrams and/or one or more combinations of the functional block diagrams shown in FIG. 1 (such as the calculating unit, the estimating unit, the self-organization processing unit, and the scheduling unit, etc.) may either correspond to software modules of procedures of a computer program, or correspond to hardware modules. Such software modules may respectively correspond to the steps shown in FIG. 8. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in figures may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of the present disclosure containing the above embodiments, following supplements are further disclosed.

Supplement 1. A method for implementing a network device system, including:
determining first times needed by functional modules of a network device in implementing respective functions according to processing abilities of physical resources;
estimating second times needed by the functional modules in implementing respective functions according to the first times of the functional modules and empirical factors corresponding to the functional modules;
determining physical resources needed by the network device according to the second times of the functional modules; and
determining a scheduling scheme of the functional modules at current configurations according to the physical resources needed by the network device and scheduling schemes corresponding to different configurations of the functional modules.

Supplement 2. The method according to supplement 1, wherein the network device is a base station, and the functional modules are functional modules of the physical layer of the base station and include a demodulation module, a decoding module, a cyclic redundancy check module, and a downlink module.

Supplement 3. The method according to supplement 2, wherein the functional modules further include a physical random access channel module.

Supplement 4. The method according to supplement 1, wherein the determining first times needed by functional modules of a network device in implementing respective functions according to processing abilities of physical resources includes:
calculating the first time of a first functional module according to the processing abilities of the physical resources; and
determining the first time of a second functional module according to the first time of the first functional module, and wherein, a difference between a calculation amount of the first functional module and that of the second functional module is in a predetermined range.

Supplement 5. The method according to supplement 1, wherein the estimating second times needed by the functional modules in implementing respective functions according to the first times of the functional modules and empirical factors corresponding to the functional modules includes:
multiplying the first times of the functional modules by the empirical factors corresponding to the functional modules, and taking results of the multiplication as the second times needed by the functional modules in implementing respective functions.

Supplement 6. The method according to supplement 1, wherein the physical resources are processing cores, and the determining physical resources needed by the network device according to the second times of the functional modules includes:
determining the number of processing cores needed by the network device according to a processing ability of each processing core and the second times of the functional modules.

Supplement 7. The method according to supplement 1, wherein the determining a scheduling scheme of the functional modules at current configurations according to the physical resources needed by the network device and scheduling schemes corresponding to different configurations of the functional modules includes:
when the physical resource needed by the network device is one processing core, the processing core processes not only uplink transmission of the network device, but also downlink transmission of the network device, and within one subframe, the uplink transmission of the network device is scheduled first, and then the downlink transmission of the network device is scheduled; and
when the physical resources needed by the network device are more than two processing cores, each processing core processes not only uplink transmission of the network device, but also downlink transmission of the network device, and if scheduling of all functions of one functional module is unable to be implemented within one subframe, all the functions of the functional module are apportioned into multiple processing cores for scheduling.

Supplement 8. A computer readable storage medium, including a computer readable program, which will cause a processor to carry out steps of the method described in any one of supplements 1-7.

The invention claimed is:

1. A network device system, comprising:
a memory that stores a plurality of instructions;
a processor that couples to the memory and configured to execute the instructions to:
determine first times needed by functional modules of a network device in implementing respective functions according to processing abilities of physical resources;
estimate second times needed by the functional modules in implementing respective functions according to the first times of the functional modules and empirical factors corresponding to the functional modules;
determine physical resources needed by the network device according to the second times of the functional modules; and
determine a scheduling schemes of the functional modules at current configurations according to the physical resources needed by the network device and scheduling schemes corresponding to different configurations of the functional modules;
wherein the physical resources are processing cores, and the processor determines a number of processing cores needed by the network device according to a processing ability of each processing core and the second times of the functional modules.

2. The network device system according to claim 1, wherein the network device is a base station, the functional modules are functional modules of a physical layer of the base station, and the functional modules comprise a demodulation module, a decoding module, a cyclic redundancy check module, and a downlink module.

3. The network device system according to claim 2, wherein the functional modules further comprise: a physical random access channel module.

4. The network device system according to claim 1, wherein the processor is further configured to:
store the empirical factors corresponding to the functional modules; wherein, a range of values of the empirical factors corresponding to the functional modules is 0~1; and
store the scheduling schemes corresponding to the different configurations of the functional modules.

5. The network device system according to claim 1, wherein the processor is further configured to:
calculate the first time of a first functional module; and
determine the first time of a second functional module according to the first time of the first functional module, wherein, a difference between a calculation amount of the first functional module and that of the second functional module is in a predetermined range.

6. The network device system according to claim 1, wherein the processor multiplies the first times of the functional modules by the empirical factors corresponding to the functional modules, and takes results of the multiplication as the second times needed by the functional modules in implementing respective functions.

7. The network device system according to claim 1, wherein when a physical resource needed by the network device is one processing core, the scheduling scheme is that:
the processing core processes both uplink transmission of the network device and downlink transmission of the network device,
and, within one subframe, the uplink transmission of the network device is scheduled first, and then the downlink transmission of the network device is scheduled.

8. The network device system according to claim 1, wherein when the physical resources needed by the network device are more than two processing cores, the scheduling scheme is that:
each processing core processes both uplink transmission of the network device and downlink transmission of the network device,
and, if scheduling of all functions of one functional module is unable to be implemented within one subframe, all the functions of the functional module are apportioned into multiple processing cores for scheduling.

9. A method for implementing a network device system, comprising:
determining first times needed by functional modules of a network device in implementing respective functions according to processing abilities of physical resources;
estimating second times needed by the functional modules in implementing respective functions according to the first times of the functional modules and empirical factors corresponding to the functional modules;
determining physical resources needed by the network device according to the second times of the functional modules; and
determining a scheduling scheme of the functional modules at current configurations according to the physical resources needed by the network device and scheduling schemes corresponding to different configurations of the functional modules;
wherein the physical resources are processing cores, and the determining physical resources needed by the network device according to the second times of the functional modules includes:
determining a number of processing cores needed by the network device according to a processing ability of each processing core and the second times of the functional modules.

10. The method according to claim 9, wherein the network device is a base station, and the functional modules are functional modules of a physical layer of the base station and include a demodulation module, a decoding module, a cyclic redundancy check module, and a downlink module.

11. The method according to claim 10, wherein the functional modules further include a physical random access channel module.

12. The method according to claim 9 wherein the determining first times needed by functional modules of a network device in implementing respective functions according to processing abilities of physical resources includes:
calculating the first time of a first functional module according to the processing abilities of the physical resources; and
determining the first time of a second functional module according to the first time of the first functional module, and wherein, a difference between a calculation amount of the first functional module and that of the second functional module is in a predetermined range.

13. The method according to claim 9, wherein the estimating second times needed by the functional modules in implementing respective functions according to the first times of the functional modules and empirical factors corresponding to the functional modules includes:
multiplying the first times of the functional modules by the empirical factors corresponding to the functional modules, and taking results of the multiplication as the second times needed by the functional modules in implementing respective functions.

14. The method according to claim 9, wherein the determining a scheduling scheme of the functional modules at current configurations according to the physical resources needed by the network device and scheduling schemes corresponding to different configurations of the functional modules includes:
- when the physical resource needed by the network device is one processing core, the processing core processes not only uplink transmission of the network device, but also downlink transmission of the network device, and within one subframe, the uplink transmission of the network device is scheduled first, and then the downlink transmission of the network device is scheduled; and
- when the physical resources needed by the network device are more than two processing cores, each processing core processes not only uplink transmission of the network device, but also downlink transmission of the network device, and if scheduling of all functions of one functional module is unable to be implemented within one subframe, all the functions of the functional module are apportioned into multiple processing cores for scheduling.

15. A non-transitory computer readable storage medium, including a computer readable program, which will cause a processor to carry out steps of the method described in claim 9.

* * * * *